(12) United States Patent
Däschlein et al.

(10) Patent No.: US 10,279,516 B2
(45) Date of Patent: *May 7, 2019

(54) METHOD FOR PRODUCING EXPANDED GRANULATE

(71) Applicant: BASF SE, Ludwigshafen (DE)

(72) Inventors: Christian Däschlein, Schefflenz (DE); Peter Gutmann, Karlsruhe (DE); Frank Prissok, Lemförde (DE); Uwe Keppeler, Hochdorf-Assenheim (DE); Jürgen Ahlers, Groß-Rohrheim (DE)

(73) Assignee: BASF SE, Ludwigshafen Am Rhein (DE)

( * ) Notice: Subject to any disclaimer, the term of this patent is extended or adjusted under 35 U.S.C. 154(b) by 471 days.

This patent is subject to a terminal disclaimer.

(21) Appl. No.: 14/897,746

(22) PCT Filed: Jun. 11, 2014

(86) PCT No.: PCT/EP2014/062144
§ 371 (c)(1),
(2) Date: Dec. 11, 2015

(87) PCT Pub. No.: WO2014/198779
PCT Pub. Date: Dec. 18, 2014

(65) Prior Publication Data
US 2016/0121524 A1    May 5, 2016

(30) Foreign Application Priority Data

Jun. 13, 2013 (EP) ..................... 13171855

(51) Int. Cl.
*B29C 44/34* (2006.01)
*B29B 9/06* (2006.01)
(Continued)

(52) U.S. Cl.
CPC ............ *B29C 44/3461* (2013.01); *B29B 7/88* (2013.01); *B29B 9/06* (2013.01); *B29B 9/065* (2013.01);
(Continued)

(58) Field of Classification Search
CPC .. B29B 9/06; B29B 9/065; B29B 7/88; B29B 9/12; B29B 7/90; B29B 9/14;
(Continued)

(56) References Cited

U.S. PATENT DOCUMENTS 5,567,370 A     10/1996  Deseke et al.
5,609,892 A  *  3/1997   Garcia ................... B29B 9/065
                                                        264/142

(Continued)

FOREIGN PATENT DOCUMENTS

EP         0 664 197 A2     7/1995
WO    WO-2004/018551 A2     3/2004
(Continued)

OTHER PUBLICATIONS

International Search Report for PCT/EP2014/062144 dated Jul. 3, 2014.
(Continued)

*Primary Examiner* — Anthony Calandra
*Assistant Examiner* — Jerzi H Moreno Hernandez
(74) *Attorney, Agent, or Firm* — Drinker Biddle & Reath LLP

(57) ABSTRACT

A process for producing expanded pellets from a thermoplastic elastomer having an elongation at break of more than 100% measured to DIN EN ISO 527-2, comprising:
(a) pressing a polymer melt comprising a blowing agent through a perforated disk (18) controlled to a temperature between 150° C. and 280° C. and into a pelletizing chamber (26), (Continued)

(b) using a cutting device (20) to comminute the polymer melt pressed through the perforated disk (18) into individual expanding pellets, (c) discharging the pellets from the pelletizing chamber (26) using a liquid stream (36), wherein the blowing agent comprises $CO_2$ and/or $N_2$ and the amount of blowing agent in the polymer melt is from 0.5 to 2.5 wt %, the pelletizing chamber (26) is traversed by a stream of liquid at a temperature between 5° C. and 90° C. and the pressure of 0.1 bar to 20 bar above ambient pressure such that the pellets are expanded in the pressurized liquid by the blowing agent, producing expanded pellets having an uninterrupted skin.

16 Claims, 1 Drawing Sheet

(51) Int. Cl.

| | |
|---|---|
| *C08J 9/16* | (2006.01) |
| *B29B 9/12* | (2006.01) |
| *B29C 44/04* | (2006.01) |
| *C08J 9/00* | (2006.01) |
| *C08J 9/12* | (2006.01) |
| *C08J 9/34* | (2006.01) |
| *B29B 7/88* | (2006.01) |
| *B29B 7/90* | (2006.01) |
| *B29B 9/14* | (2006.01) |
| *B29C 47/00* | (2006.01) |
| *B29C 47/86* | (2006.01) |
| *B29K 21/00* | (2006.01) |
| *B29K 77/00* | (2006.01) |
| *B29K 105/00* | (2006.01) |
| *B29K 105/16* | (2006.01) |

(52) U.S. Cl.
CPC ............ *B29B 9/12* (2013.01); *B29C 44/04* (2013.01); *C08J 9/0066* (2013.01); *C08J 9/122* (2013.01); *C08J 9/16* (2013.01); *C08J 9/34* (2013.01); *B29B 7/90* (2013.01); *B29B 9/14* (2013.01); *B29C 47/0011* (2013.01); *B29C 47/0014* (2013.01); *B29C 47/86* (2013.01); *B29K 2021/003* (2013.01); *B29K 2077/00* (2013.01); *B29K 2105/0085* (2013.01); *B29K 2105/16* (2013.01); *B29K 2995/007* (2013.01); *B29K 2995/0082* (2013.01); *C08J 2201/03* (2013.01); *C08J 2203/06* (2013.01); *C08J 2300/22* (2013.01); *C08J 2300/26* (2013.01); *C08J 2377/06* (2013.01)

(58) Field of Classification Search
CPC ........... B29C 44/3461; B29C 47/0011; B29C 47/0014; B29C 47/86; B29C 44/04; B29K 2021/003; B29K 2077/00; B29K 2105/0085; B29K 2995/0082; B29K 2105/16; B29K 2995/007; C08J 9/16; C08J 2201/03; C08J 9/122; C08J 2203/06; C08J 9/34; C08J 2377/06; C08J 2300/22; C08J 2300/26

See application file for complete search history.

(56) References Cited

U.S. PATENT DOCUMENTS

| | | | |
|---|---|---|---|
| 10,005,218 B2* | 6/2018 | Rudolph | C08G 18/6674 |
| 2005/0062191 A1* | 3/2005 | Kurashige | B29B 7/7495 |
| | | | 264/140 |
| 2005/0140039 A1* | 6/2005 | Casalini | B29B 9/065 |
| | | | 264/51 |
| 2009/0065960 A1* | 3/2009 | Allmendinger | B29C 44/105 |
| | | | 264/12 |
| 2009/0108480 A1* | 4/2009 | Schmaus | B29B 9/065 |
| | | | 264/12 |
| 2010/0222442 A1* | 9/2010 | Prissok | C08G 18/4854 |
| | | | 521/60 |
| 2011/0306719 A1* | 12/2011 | Hilmer | C08G 18/664 |
| | | | 524/539 |
| 2012/0053278 A1* | 3/2012 | Malucelli | B29B 9/16 |
| | | | 524/400 |
| 2012/0100376 A1* | 4/2012 | Sakaguchi | B29C 44/3461 |
| | | | 428/407 |
| 2013/0150468 A1* | 6/2013 | Fussi | C08J 9/0061 |
| | | | 521/59 |
| 2014/0001669 A1* | 1/2014 | Boothe | B29B 9/065 |
| | | | 264/142 |
| 2015/0174808 A1* | 6/2015 | Rudolph | C08G 18/6674 |
| | | | 264/12 |

FOREIGN PATENT DOCUMENTS

| | | |
|---|---|---|
| WO | WO-2007/044123 A1 | 4/2007 |
| WO | WO-2007082838 A1 | 7/2007 |
| WO | WO-2013153190 A1 | 10/2013 |

OTHER PUBLICATIONS

Sorenson, Wayne R., et al., "Preparative Methods of Polymer Chemistry", Polymer Chemistry, Interscience Publishers, New York, 1961, pp. 111-127.

Smith, James G., et al., Preparation and Properties of Poly(methylene terephthalates), Journal of Polymer Science, Part A1, 4, pp. 1851-1859 (1966).

Weber, Heinz, et al., "Foamed Plastics", Ullman's "Encyclopedia of Industrial Chemistry", (version of 2002) vol. 15, pp. 540-570 (2012).

* cited by examiner

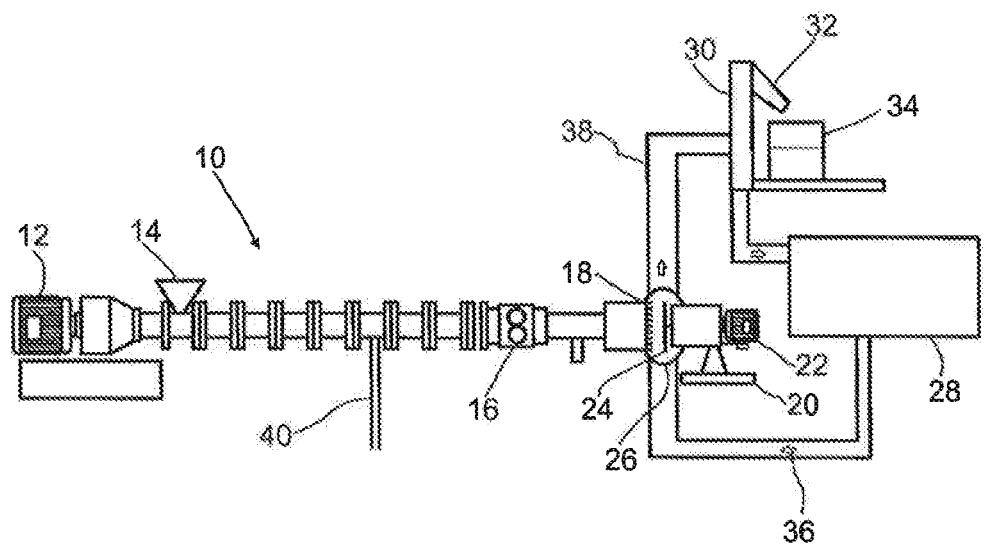

METHOD FOR PRODUCING EXPANDED GRANULATE

CROSS-REFERENCE TO RELATED APPLICATIONS

This application is a national stage application (under 35 U.S.C. § 371) of PCT/EP2014/062144, filed Jun. 11, 2014, which claims benefit of European Application No. 13171855.3, filed Jun. 13, 2013, both applications of which are incorporated herein by reference in their entirety.

BACKGROUND OF THE INVENTION

This invention relates to a process for production of expanded pellets from a thermoplastic elastomer having an elongation at break of more than 100% measured to DIN EN ISO 527-2. Expanded pellets of thermoplastic elastomers having an elongation at break of more than 100% measured to DIN EN ISO 527-2, have elastic and tribological properties and so are useful in a wide variety of applications. Examples of uses for corresponding expanded pellets include reusable gymnastics mats, body protectors, trim elements in automobile building, sound and vibration absorbers, packaging or in shoe soles. High elasticity and good homogeneity on the part of the pellets are of decisive importance for all these sectors.

Foamed materials, including bead foams in particular, are long known and have been extensively described in the literature, for example in Ullmann's "Enzyklopädie der technischem Chemie", 4$^{th}$ edition, volume 20, p. 416 ff.

WO 2007/082838 discloses a process for production of expanded thermoplastic polyurethane comprising a blowing agent. A first step of the process comprises extruding a thermoplastic polyurethane into pellets. The pellets are impregnated with a blowing agent in an aqueous suspension under pressure in a second step and expanded in a third step. In a further embodiment of the process, the thermoplastic polyurethane is melted in an extruder together with a blowing agent and the melt is pelletized without a device to prevent foaming. Volatile organic compounds are used as blowing agents in the production via extrusion.

EP-A 0 664 197 discloses the production of expanded thermoplastic elastomers using water as blowing agent in an endeavour to avoid organic blowing agents. An alternative process for producing foams from thermoplastic elastomers by use of carbon dioxide and nitrogen as blowing agents is known, for example from WO 2004/018551. A further process for producing expanded thermoplastic elastomers which recurs to the foam production process described in WO 2004/018551 is also disclosed in WO 2007/044123.

None of the documents known from the prior art, however, discloses that the process described can also be used to produce expanded pellets having an uninterrupted skin.

The use of an extrusion process to produce expanded pellets of TPU permits continuous production and hence rapid processing of a variety of hardnesses and also the rapid switch between further properties, for example the color of the expanded beads produced.

Yet there is a problem with the direct production of expanded pellets via extrusion in that the beads expand without an uninterrupted skin forming in the process and the expanded beads collapse, making it impossible to produce beads of low bulk density. It is similarly disadvantageous that the blowing agents used are flammable and so are difficult to process because of an ever present risk of explosion. Furthermore, the expanded pellets produced have to be stored until the flammable blowing agent used has volatilized before they can be shipped out.

SUMMARY OF THE INVENTION

It is an object of the present invention to provide a process for production of expanded pellets from a thermoplastic elastomer having an elongation at break of more than 100% measured to DIN EN ISO 527-2 which do have an uninterrupted skin, without the disadvantages known from the prior art. The pellets produced using the process shall have a homogeneous shape, a homogeneous cellular structure and very low bulk densities. At the same time, a large range of various densities shall be possible with the process used. Moreover, usage of organic blowing agents shall be eschewed.

DETAILED DESCRIPTION OF THE INVENTION

This object is achieved by a process for production of expanded pellets from a thermoplastic elastomer having an elongation at break of more than 100% measured to DIN EN ISO 527-2, said process comprising the steps of:
  (a) pressing a polymer melt comprising a blowing agent through a perforated disk controlled to a temperature between 150° C. and 280° C. and into a pelletizing chamber,
  (b) using a cutting device to comminute the polymer melt pressed through the temperature-controlled perforated disk into individual expanding pellets,
  (c) discharging the pellets from the pelletizing chamber using a liquid stream,
wherein the blowing agent comprises $CO_2$ or $N_2$ or a combination of $CO_2$ and $N_2$ and the amount of blowing agent in the polymer melt comprising a blowing agent lies in the range from 0.5 to 2.5 wt % and wherein the pelletizing chamber is traversed by a stream of liquid which is controlled to a temperature between 5° C. and 90° C. and the pressure of which is from 0.1 bar to 20 bar above ambient pressure, the pressure and temperature for the liquid in the pelletizing chamber and also the temperature for the perforated disk being chosen such that the pellets are expanded in the pressurized liquid by the blowing agent they contain so as to produce expanded pellets having an uninterrupted skin.

It surprisingly transpired that the lowest bulk densities are not obtained, as would be expected, at very high blowing agent quantities, but that a blowing agent quantity of not more than 2.5 wt %, preferably of not more than 2 wt % and especially of not more than 1.5 wt % lead to a particularly low bulk density. When blowing agent quantity is less than 0.5 wt %, bulk density likewise rises again. The respective mass fractions here are based on the overall mass of polymer melt including blowing agent present therein.

The optimum quantity of blowing agent to be used depends on the thermoplastic elastomer used and on the composition of the blowing agent, but is always in the range between 0.5 and 2.5 wt %.

The polymer melt mixed with a blowing agent and optionally further admixture agents is forced through the perforated disk in step (a) of the process. The production of the polymer melt comprising blowing agent and optionally further admixture agents is generally effected using an extruder and/or a melt pump. These apparatuses are also used to generate the pressure required to press the polymer melt through the perforated disk. When an extruder, for example a twin-screw extruder, is used, the polymer is first plasticated and optionally mixed with auxiliary agents. During mixing, the material in the extruder is transported in the direction of the temperature-controlled perforated disk. If the blowing agent was not introduced into the extruder from the start together with the polymer, it can be added to the polymer after the polymer has traveled part of the distance in the extruder. The blowing agent and the polymer become mixed as they travel through the remaining distance in the extruder. In the process, the melt is brought to the temperature required for the subsequent pelletization. The pressure required for pressing the melt through the perforated disk can be applied by a melt pump for example. Alternatively, the pressure required is generated by the appropriate geometry of the extruder and in particular, of the extruder screw. The pressure required for the pelletization and the temperature required for the melt are dependent on the polymer used and also the auxiliary agents used and the blowing agent used and are further dependent on the mixing ratio between the components. It is through the temperature-controlled perforated disk that the polymer melt passes into the pelletizing chamber. The pelletizing chamber is traversed by a stream of a temperature-controlled liquid, the pressure of which is from 0.1 bar to 20 bar above ambient pressure. The pressure of the liquid flowing through the pelletizing chamber is preferably 0.1 to 5 bar above ambient pressure.

In the pelletizing chamber, the polymer forced through the temperature-controlled perforated disk is shaped into strands which a cutting device comminutes into individual expanding pellets. The cutting device may be embodied as a fast-rotating blade for example. The shape of the resulting pellets is dependent on the shape and size of the openings in the perforated disk and also on the pressure at which the melt is forced through the holes in the perforated disk and on the speed of the cutting device. It is preferable for the forcing pressure, the speed of the cutting device and the size of the holes in the perforated disk to be chosen such that the shape of the pellets is substantially spherical or elliptical.

In the last step of the process, the pellets are discharged from the pelletizing chamber by the temperature-controlled liquid which flows through the pelletizing chamber. The choice of the pressure and the temperature for the temperature-controlled liquid is such that the polymer strands/pellets are expanded by the blowing agent they contain in controlled fashion and an uninterrupted skin is produced on the surface of the pellets.

The pellets flow together with the temperature-controlled liquid into a dryer where the pellets are separated from the liquid. The final expanded pellets are collected in a container, while the liquid is filtered and returned back into the pelletizing chamber via a pump.

Pelletization in a pressurized liquid where the temperature of the liquid is under control prevents the polymer melt comprising a blowing agent from undergoing an uncontrolled expansion in which no formation of an uninterrupted skin can take place. Such beads would initially have a low bulk density, but would quickly each collapse again. The result would be inhomogeneous beads of high bulk density and lower elasticity. The process of the present invention slows the expansion of the pellets in a controlled way to produce structured particles that have an uninterrupted skin and a cellular structure on the inside, wherein the cell size is low at the surface and increases toward the center. The size of the cells at the center is preferably less than 250 μm. The bulk density of the expanded pellets is not more than 250 g/l. Maximum expansion for the individual expanded pellets is preferably in the range from 2 to 15 mm, in particular in the range from 5 to 12 mm, while the mass of an individual pellet is between 2 and 40 mg, in particular between 5 and 35 mg.

Pellet expansion is policed by controlling the pressure and temperature of the temperature-controlled liquid in the pelletizing chamber and also by controlling the temperature of the perforated disk. When the pellets expand too rapidly and/or in an uncontrolled fashion, meaning that no uninterrupted skin is formed, the pressure of the liquid in the pelletizing chamber is raised and the temperature of the temperature-controlled liquid in the pelletizing chamber is lowered. The increased pressure of the temperature-controlled liquid surrounding the pellets counteracts the expanding effect of the blowing agent and brakes the expansion of the pellets. Reducing the temperature of the temperature-controlled liquid in the pelletizing chamber brings about a thicker skin on the beads and thus offers more resistance to expansion. When the temperature-controlled liquid is at too high a pressure or too low a temperature relative to the blowing agent used, expansion of the pellets can be excessively hindered or even completely stopped, producing pellets where the bulk density is too high. In this case, the pressure of the temperature-controlled liquid in the pelletizing chamber is lowered and/or the temperature of the temperature-controlled liquid is raised.

As an addition or alternative to adjusting the pressure and/or the temperature of the temperature-controlled liquid in the pelletizing chamber, the expansion of the pellets can also be influenced through the temperature of the temperature-controlled perforated disk. Lowering the temperature of the temperature-controlled perforated disk has the effect of releasing heat from the polymer melt more quickly into the environment. This promotes the formation of an uninterrupted skin, which is a prerequisite for a stable foamed pellet. If the temperature of the temperature-controlled perforated disk and/or of the liquid in the pelletizing chamber is made too low, the polymer melt will cool down too quickly and solidify before adequate expansion can commence. Expansion of the pellet by the blowing agent it contains is so severely impeded as to form pellets having an excessively high bulk density. Therefore, the temperature of the temperature-controlled liquid in the pelletizing chamber and/or the temperature of the temperature-controlled perforated disk are raised in such a case.

In accordance with the invention, the temperature of the liquid in the pelletizing chamber is preferably between 5° C. and 90° C. in order that the pellets may undergo a controlled expansion in which an uninterrupted foamed skin is formed. The temperature of the liquid is preferably between 10° C. and 60° C. and more preferably between 25° C. and 45° C. In accordance with the invention, the temperature of the temperature-controlled perforated disk is preferably between 150° C. and 280° C., more preferably between 220° C. and 260° C.

An excessive temperature on the part of the perforated disk leads to a thin skin on the surface of the beads and to a later collapsing of the surface. Excessively low temperatures on the part of the perforated disk reduce the degree of expansion and lead to thick, unfoamed surfaces on the beads.

Thermoplastic elastomers used for the process of producing expanded pellets in the manner of the present invention include, for example, thermoplastic polyesterelastorners, for example polyetheresters or polyesteresters, thermoplastic polyether copolyamides, for example polyether copolyamides, or styrene block copolymers, for example styrene-butadiene-block copolymers.

It turned out that for thermoplastic polyesterelastomers, for example polyetherester and polyesterester, and for styrene-block copolymers, for example styrene-butadiene-block copolymers, lowest densities can be achieved, when the blowing agent quantity is more than 0.5 wt % and less than 1.5 wt % and the pressure of the temperature-controlled liquid flowing through the pelletizing chamber is in the range from 0.1 to 2 bar above ambient pressure. For thermoplastic copolyamides, for example polyether copolyamides, the blowing agent quantity preferably is more than 1.5 wt % and less than 2.5 wt % and the pressure in the pelletizing chamber is preferably 5 to 20 bar above ambient pressure.

The thermoplastic polyetheresters and polyesteresters in question are obtainable according to any common literature method by esterification or transesterification of aromatic and aliphatic dicarboxylic acids of 4 to 20 carbon atoms and, respectively, esters thereof with suitable aliphatic and aromatic diols and polyols. Corresponding methods of making are described for example in "Polymer Chemistry", Interscience Publ., New York, 1961, pp. 111-127; Kunststoffhandbuch, volume VIII, C. Hanser Verlag, Munich 1973 and Journal of Polymer Science, Part A1, 4, pages 1851-1859 (1966).

Useful aromatic dicarboxylic acids include, for example, phthalic acid, isophthalic acid and teraphthalic acid or, respectively, esters thereof. Useful aliphatic dicarboxylic acids include, for example, 1,4-cyclohexanedicarboxylic acid, adipic acid, sebacic acid, azelaic acid, and decanedicarboxylic acid as saturated dicarboxylic acids and also maleic acid, fumaric acid, aconitic acid, itaconic acid, tetrahydrophthalic acid and tetrahydroterephthalic acid as unsaturated dicarboxylic acids.

Useful diol components include, for example, diols of general formula $HO-(CH_2)_n-OH$, where n is an integer from 2 to 20. Useful diols include, for example, ethylene glycol, 1,3-propanediol, 1,4-butanediol or 1,6-hexanediol.

Polyetherols transesterifiable to the thermoplastic polyetherester are preferably those of general formula $HO-(CH_2)_n-O-(CH_2)_m-OH$, where n and m are each independently an integer between 2 and 20 and n and m may be the same or different.

Unsaturated diols and polyetherols useful for producing the polyetherester include, for example 1,4-butenediol and also polyetherols and diols comprising aromatic units.

In addition to the recited carboxylic acids and esters thereof and also the recited alcohols, any further common representatives of these classes of compounds can be used for providing the polyetheresters and polyesteresters used in the process of the present invention. The hard phases of the block copolymers are typically formed from aromatic dicarboxylic acids and short-chain dials, while the soft phases are formed from ready-formed aliphatic, difunctional polyesters having a molecular weight $M_W$ between 500 and 3000 g/mol. The hard and soft phases may be additionally coupled via reactive connectors such as diisocyanates which react with terminal alcohol groups for example.

Thermoplastic polyetheramides useful for the process of the present invention are also obtainable according to any known literature method via reaction of amines and carboxylic acids, or esters thereof. Amines and/or carboxylic acids in this case further comprise ether units of the R—O—R type, where R is an aliphatic or aromatic organic radical. Monomers selected from the following classes of compounds are used in general:

$HOOC-R'-NH_2$, where R' may be aromatic or aliphatic and preferably comprises ether units of the R—O—R type. R therein is an aliphatic or aromatic organic radical, aromatic dicarboxylic acids, for example phthalic acid, isophthalic acid and terephthalic acid, or esters thereof, and also aromatic dicarboxylic acids comprising ether units of the R—O—R type, where R is an aliphatic or aromatic organic radical, aliphatic dicarboxylic acids, for example 1,4-cyclohexane dicarboxylic acid, adipic acid, sebacic acid, azelaic acid, and decanedicarboxylic acid as saturated dicarboxylic acids and also maleic acid, fumaric acid, aconitic acid, itaconic acid, tetrahydrophthalic acid and tetrahydroterephthalic acid as unsaturated dicarboxylic acids, and also aliphatic dicarboxylic acids comprising ether units of the R—O—R type, where R is an aliphatic and/or aromatic organic radical, diamines of general formula $H_2N-R''-NH_2$, where R'' may be aromatic and aliphatic and preferably comprises ether units of the R—O—R type and R is an aliphatic and/or aromatic organic radical, lactams, for example ε-caprolactam, pyrrolidone or laurolactam, and also amino acids.

In addition to the recited carboxylic acids and esters thereof and also the recited amines, lactams and amino acids, any further common representatives of these classes of compounds can be used for providing the polyetheramine used in the process of the present invention. Also known are mixed products of polytetrahydrofuran and amide synthons, which can likewise be used.

The thermoplastic elastomers of block copolymer structure which are used according to the present invention, preferably comprise vinylaromatic, butadiene and isoprene and also polyolefin and vinylic units, for example ethylene, propylene and vinyl acetate units. Styrene-butadiene copolymers are preferred.

The thermoplastic elastomers used according to the present invention preferably have a Shore hardness in the range from A40 to D80. Particular preference is given to Shore hardnesses in the range from A44 to D60, in particular in the range from A65 to A99. Particular preference is given to Shore hardnesses in the range from A65 to A96. Shore hardnesses are determined according to DIN 53505. The melting point of the thermoplastic elastomers used according to the present invention is preferably below 300° C., more preferably not more than 250° C. and especially not more than 220° C. The elongation at break of the thermoplastic elastomers of the present invention is greater than 100% measured to DIN EN ISO 527-2, preferably greater than 200%, further preferably greater than 300% and particularly greater than 400%. Further, the elongation at break is preferably at most 1000%, particularly at most 800%.

The thermoplastic elastomers used according to the present invention may be amorphous or partly crystalline.

The expanded pellets obtained using the process of the present invention may comprise further admixture agents such as dyes, pigments, fillers, flame retardants, synergists for flame retardants, antistats, stabilizers, surface-active substances, plasticizers and infrared opacifiers in effective amounts.

Suitable infrared opacifiers to reduce the radiative contribution to thermal conductivity include, for example, metal oxides, nonmetal oxides, metal powders, for example aluminum powders, carbon, for example carbon black, graphite or diamond, or organic dyes and pigment dyes. The use of infrared opacifiers is advantageous for applications at high temperatures in particular. Carbon black, titanium dioxide, iron oxides or zirconium dioxide are particularly preferred for use as infrared opacifiers. The aforementioned materials can be used not only each on its own but also in combination, i.e., in the form of a mixture of two or more materials. Any fillers can be organic and/or inorganic.

When fillers are comprised, these are for example organic and inorganic powders or fibrous materials and also mixtures thereof. Useful organic fillers include for example wood flour, starch, flax fibers, hemp fibers, ramie fibers, jute fibers, sisal fibers, cotton fibers, cellulose fibers or aramid fibers. Useful inorganic fillers include for example silicates, barite, glass balls, zeolites, metals or metal oxides. Particular preference is given to using pulverulent inorganics such as chalk, kaolin, aluminum hydroxide, magnesium hydroxide, aluminum nitrite, aluminum silicate, barium sulfate, calcium carbonate, calcium sulfate, silica, powdered quartz, Aerosil, argillaceous earth, mica or wollastonite or spherical or fibrous inorganics, for example iron powder, glass balls, glass fibers or carbon fibers. The average particle diameter or, in the case of fibrous fillers, the length of the fibers should be in the region of the cell size or less. Preference is given to an average particle diameter or average fiber length in the range from 0.1 to 100 μm and in particular in the range from 1 to 50 μm. Preference is given to expandable thermoplastic elastomers which comprise a blowing agent and also between 5 and 80 wt % of organic and/or inorganic fillers, based on the total weight of the system comprising a blowing agent.

Useful surface-active substances for inclusion in the thermoplastic molding composition include for example compounds which are used to augment homogenization of starting materials and may also be capable of regulating the cell structure. Suitable surface-active substances include for example emulsifiers, for example sodium salts of castor oil sulfates or of fatty acids and also salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers such as siloxane-oxyalkylene interpolymers and other organosiloxanes, ethoxylated alkylphenols, ethoxylated fatty alcohols, paraffin oils, castor oil esters or ricinoleic esters, Turkey red oil and peanut oil, and cell regulators, for example paraffins, fatty alcohols and dimethylpolysiloxane. Oligomeric polyacrylates having polyoxyalkylene and fluoroalkane moieties as side groups are further useful for improving the emulsifying effect, the cell structure and/or the stabilization thereof. Surface-active substances are typically used in amounts of 0.01 to 5 wt %, based on the overall weight of the system comprising blowing agent.

Suitable flame retardants include for example tricresyl phosphate, tris(2-chloroethyl) phosphate, tris(2-chloropropyl) phosphate, tris(1,3-dichloropropyl) phosphate, tris(2,3-dibromopropyl) phosphate and tetrakis(2-chloroethyl)ethylene diphosphate. In addition to the halogen-substituted phosphates already mentioned, inorganic flame retardants comprising red phosphorus, aluminum oxide hydrate, antimony trioxide, arsenic trioxide, ammonium polyphosphate and calcium sulfate or cyanuric acid derivatives, for example melamine or mixtures of at least two flame retardants, for example ammonium phosphate and melamine and also optionally starch and/or expandable graphite can also be used for conferring flame retardancy on the foamed thermoplastic elastomers produced. It will generally prove advantageous to use from 0 to 50 wt % and preferably from 5 to 25 wt % of flame retardant or flame retardant mixtures based on the overall weight of the system comprising blowing agent.

Before the polymer melt is pressed into the pelletizing chamber, it is mixed with the blowing agent $CO_2$ or a mixture of $CO_2$ and $N_2$. A co-blowing agent can additionally be added to the polymer melt. Useful co-blowing agents include alkanes such as ethane, propane, butane, pentane, alcohols such as ethanol, isopropanol, halogenated hydrocarbons or CFCs or a mixture thereof. The sole use of $CO_2$ or a mixture of $CO_2$ and $N_2$ as blowing agent is particularly advantageous, since they are inert gases, which are non-flammable, so that no potentially explosive atmospheres can arise in manufacture. This makes cost-intensive safety precautions unnecessary and greatly reduces potential risk in production. It is likewise advantageous that the products do not have to be stored to allow flammable volatiles to gas out before the products are shipped out.

Further advantages arise on additionally adding one or more nucleating agents to the polymer melt comprising a blowing agent. Useful nucleating agents include in particular talc, calcium fluoride, sodium phenylphosphinate, aluminum oxide, carbon black, graphite, pigments and finely divided polytetrafluoroethylene each individually or else in any mixtures. Talc is particularly preferable for use as nucleating agent. The proportion of the overall mass of the thermoplastic molding composition or of the polymer melt which is attributable to the nucleating agent is preferably in the range from 0 to 4 wt % and especially in the range from 0.1 to 2 wt %.

The invention will now be more particularly described with reference to drawings. The sole FIGURE shows a schematic depiction of an apparatus for pelletizing polymer melts.

FIG. 1 shows a schematic depiction of an apparatus for producing expanded pellets from a polymer melt comprising a blowing agent. The starting polymer is introduced into an extruder 10 via a feed hopper 14. The extruder 10 is configured for example as a twin-screw extruder and is powered via a motor 12. The feed hopper 14 may further be used to add auxiliaries such as for example dyes or nucleating agents. The raw material introduced is melted and plasticated in the extruder. In the process, the material is transported in the direction of a perforated disk 18.

In the embodiment depicted in FIG. 1 a melt pump 16 is disposed upstream of the perforated disk 18 to apply a pressure to the melt. The pressure is chosen as a function of the type and quantity of blowing agent used. The blowing agent is introduced into the polymer melt via an add point 40 on the extruder 10 between the feed hopper 14 and the melt pump 16. In the depicted embodiment the add point 40 for the blowing agent is disposed such that the blowing agent is only added after all the polymer has melted. The introduced blowing agent becomes incorporated into the melt during the remaining distance in the extruder. A mixture of carbon dioxide and nitrogen is an example of the suitable blowing agent.

The melt pump 16 helps to force the melt through the perforated disk 18 and into a pelletizing chamber 26. The pelletizing chamber is traversed by a stream of liquid, the pressure of which is above ambient pressure. The direction of flow is indicated by the arrows 36. Inside the pelletizing chamber 26 a rotating blade 24 is disposed in a cutting device, for example a pelletizing means or device 20. The rotating blade 24 is driven by a motor 22. The polymer melt exits from the perforated disk 18 as a plurality of expanding polymeric strands which are chopped off by the rotating blade 24. Individual expanding pellets are produced in the process. The forcing pressure and also the speed of the cutting device are chosen such that the shape of the pellets is substantially spherical.

The pellets in the temperature-controlled liquid are expanded by the blowing agent they contain, while the temperature of the temperature-controlled liquid and of the temperature-controlled perforated disk and also the pressure of the temperature-controlled liquid have been chosen such that the expanded pellets have an uninterrupted foamed skin. The stream of temperature-controlled liquid discharges the resulting expanding/expanded pellets from the pelletizing chamber 26 and feeds them via the circuit line 38 into a dryer 30. In the dryer 30, the expanded pellets are separated from the temperature-controlled liquid and dried and sent, via the product discharge 32, into a collecting container 34. The temperature-controlled liquid from which the pellets have been removed continues to flow through the circuit line 38 into a circuit pump 28, where the temperature-controlled liquid is filtered, temperature controlled and pressurized. From the circuit pump 28 the temperature-controlled liquid flows back into the pelletizing chamber 26.

EXAMPLES

A twin-screw extruder having a screw diameter of 18 mm and a length to diameter ratio of 40 is charged with 99.5 parts by weight of a thermoplastic elastomer (TPE) and 0.5 parts by weight of talc. The thermoplastic elastomer was melted in the melting zone of the twin-screw extruder and mixed with the talc. After the melting of the thermoplastic elastomer and the admixing of the talc, $CO_2$ or in example 6 a mixture of $CO_2$ and $N_2$ was added as a blowing agent. The amounts of blowing agent added are each tabulated in the examples. In the course of traveling the remaining distance in the extruder, the blowing agent and the polymer melt became mixed with each other to form a homogeneous mixture. Total throughput through the extruder which contained the TPE, the talc and the blowing agent was 3.5 kg/h.

In the examples 1 to 5, the following process parameters have been set: The temperature in the extruder in the melting zone and during the admixing of the talc into the TPU was, depending on the TPE used, between 230° C. and 220° C. The temperature at the extruder housing of the injection site was reduced to between 205° C. and 220° C. and the subsequent housing to between 200° C. and 220° C. All further housing parts up to the extruder end and also the melt pump were maintained at from 200° C. to 220° C. The melt pump produced a 90 bar pressure at the end of the extruder. The temperature of the startup valve was set to 210° C. or 220° C. and the perforated disk was heated to a target temperature of 250° C. by electric heating.

In example 6, the following process parameters have been set: The temperature in the extruder been set uniformly to 180° C. up to the start-up valve and the perforated disk was heated to a target temperature of 250° C. by electric heating. The melt pump produced a 90 bar pressure at the end of the extruder.

In all examples, the mixture of TPE, talc and blowing agent was pressed through the perforated disk having a hole with a diameter of 1 mm and chopped off in the downstream water-traversed pelletizing chamber by 10 rotating blades attached to a ring of blades. In the examples 1 to 5, the pressure in the pelletizing chamber was 1 bar and in example 6 the pressure in the pelletizing chamber has been set to 10 to 15 bar. The temperature-controlled medium was maintained at a constant 30° C. During its presence in the pelletizing chamber the mixture expands. Beads having an average size of about 2 mm and a weight of about 2 mg were produced in the process. To determine bulk density, a 100 ml vessel was filled with the expanded beads and weighed to an accuracy of ±5 g/l. In all examples the produced pellets have an uninterrupted skin.

The examples hereinbelow report the results.

Example 1

The TPE used was a polyetherester based on polytetrahydrofuran (poly-THF) and polybutylene terephthalate (PBT) and having an elongation at break of more than 500%, a Shore hardness of 90 A and a melting range from 175 to 190° C. This TPE was processed by the method described above and the bulk density was determined as described above. The bulk densities corresponding to the particular proportions of blowing agent added are listed in table 1.

TABLE 1

| Example | $CO_2$ (wt %) | Bulk density (g/l) |
|---|---|---|
| 1.1 | 0.5 | 342 |
| 1.2 | 0.75 | 299 |
| 1.3 | 1.0 | 229 |
| 1.4 | 1.25 | 164 |
| 1.5 | 1.5 | 254 |
| 1.6 | 1.75 | 378 |
| 1.7 | 2 | 355 |
| 1.8 | 2.5 | 367 |

Example 2

The TPE used was a polyesterester based on 1,4-benzdicarboxylic acid, dimethyl ester, 1,4-butanediol and α-hydro-ω-hydroxypoly(oxy-1,4-butanediyl) and having an elongation at break of more than 700%, a Shore hardness of 96 A and a melting range from 200 to 220° C., obtainable as Pelprene® P-70B from Toyobo Co, Ltd., for example. This TPE was processed by the method described above and the bulk density was determined as described above. The bulk densities corresponding to the particular proportions of blowing agent added are listed in table 2.

TABLE 2

| Example | $CO_2$ (wt %) | Bulk density (g/l) |
|---|---|---|
| 2.1 | 0.5 | 340 |
| 2.2 | 0.75 | 267 |
| 2.3 | 1.0 | 202 |
| 2.4 | 1.25 | 153 |
| 2.5 | 1.5 | 257 |
| 2.6 | 1.75 | 393 |
| 2.7 | 2 | 372 |
| 2.8 | 2.5 | 379 |

Example 3

The TPE used was a styrene-butadiene block copolymer (SBC) having the properties of a thermoplastic elastomer (S-TPE, elongation at break greater than 300%, Shore hardness 84 A, an MVR (melt volume rate) (200° C./5 kg)=14 cm³/10 min), obtainable as Styroflex® 2G66 from Styrolution for example. This TPE was processed by the method described above and the bulk density was determined as described above. The bulk densities corresponding to the particular proportions of blowing agent added are listed in table 3.

TABLE 3

| Example | CO$_2$ (wt %) | Bulk density (g/l) |
|---|---|---|
| 3.1 | 0.5 | 256 |
| 3.2 | 0.75 | 181 |
| 3.3 | 1.0 | 244 |
| 3.4 | 1.25 | 349 |
| 3.5 | 1.5 | 389 |
| 3.6 | 1.75 | 392 |
| 3.7 | 2 | 401 |
| 3.8 | 2.5 | 387 |

Example 4

The TPE used was a polyetherester having a polyether soft segment having an elongation at break of more than 450%, a Shore hardness of 38 D and an MVR (190° C./2.16 kg) of 28 cm$^3$/10 min, obtainable as Arnitel® PL380 from DSM for example. This TPE was processed by the method described above and the bulk density was determined as described above. The bulk densities corresponding to the particular proportions of blowing agent added are listed in table 4.

TABLE 4

| Example | CO$_2$ (wt %) | Buik density (g/l) |
|---|---|---|
| 4.1 | 0.5 | 289 |
| 4.2 | 0.75 | 192 |
| 4.3 | 1.0 | 183 |
| 4.4 | 1.25 | 169 |
| 4.5 | 1.5 | 257 |
| 4.6 | 1.75 | 278 |
| 4.7 | 2 | 275 |
| 4.8 | 2.5 | 281 |

Example 5

The TPE used was a polyetherester based on hard (crystalline) polybutylene terephthalate segments and soft (amorphous) units derived from long-chain polyether glycols having an elongation at break of more than 700%, a Shore hardness of 30 D and an MFR mass flow rate (190° C./2.16 kg) of 5 g/10 min, obtainable as Hytrel® 3078 from DuPont for example. This TPE was processed by the method described above and the bulk density was determined as described above. The bulk densities corresponding to the particular proportions of blowing agent added are listed in table 5.

TABLE 5

| Example | CO$_2$ (wt %) | Bulk density (g/l) |
|---|---|---|
| 5.1 | 0.5 | 273 |
| 5.2 | 0.75 | 204 |
| 5.3 | 1.0 | 175 |
| 5.4 | 1.25 | 214 |
| 5.5 | 1.5 | 265 |
| 5.6 | 1.75 | 299 |
| 5.7 | 2 | 287 |
| 5.8 | 2.5 | 284 |

Example 6

The TPE used was a polyether copolyamide based on elastic polyether units and crystalline polyamide units having an elongation at break of more than 750%, a Shore hardness of 27D and a melting point of 134° C. to ISO 11357, obtainable as Pebax® 2533 SD 02 from Arkema. This TPE was processed by the method described above and the bulk density was determined as described above. The bulk density corresponding to the particular proportions of blowing agent and the different pressures of the temperature-controlled liquid flowing through the pelletizing chamber are listed in table 6.

TABLE 6

| Example | CO$_2$ (wt %) | N$_2$ (wt %) | pressure in the pelletizing chamber (bar) | bulk density (g/l) |
|---|---|---|---|---|
| 6.1 | 1.75 | 0.3 | 10 | 213 |
| 6.2 | 1.75 | 0.3 | 15 | 167 |

LIST OF REFERENCE NUMERALS

10 Extruder
12 Motor
14 Feed hopper
16 Melt pump
18 Perforated disk
20 cutting device, for example a pelletizing means or device
22 Motor
24 Blade
26 Pelletizing chamber
28 Circuit pump
30 Dryer
32 Product discharge
34 Collecting container
36 Flow direction
38 Circuit line
40 Add point for blowing agent

We claim:

1. A process for production of expanded pellets from a thermoplastic elastomer having an elongation at break of more than 100% measured to DIN EN ISO 527-2, said process comprising:
(a) pressing a polymer melt comprising the thermoplastic elastomer having an elongation at break of more than 100% measured to DIN EN ISO 527-2 and a blowing agent through a perforated disk controlled to a temperature between 150° C. and 280° C.,
(b) using a cutting device to comminute the polymer melt pressed through the perforated disk into expanded pellets, the expended pellets disposed in a pelletizing chamber,
(c) discharging the pellets from the pelletizing chamber using a liquid stream
that traverses the pelletizing chamber, the liquid stream controlled to a temperature between 5° C. and 90° C. and to a pressure from 0.1 bar to 20 bar above ambient pressure,
wherein the pressure and temperature of the liquid stream, and the temperature of the perforated disk being chosen such that the pellets expand in the pressurized liquid stream to produce expanded pellets having an uninterrupted skin, and the blowing agent comprises CO$_2$ or $N_2$, or a combination of $CO_2$ and $N_2$, and the amount of blowing agent in the polymer melt is in a range from 0.5 to 2.5 wt %.

2. The process according to claim 1 wherein the polymer melt comprises a thermoplastic elastomer selected from polyetheramides, polyetheresters, polyesteresters or styrene-butadiene-block copolymers.

3. The process according to claim 1 wherein the thermoplastic elastomer has an elongation at break of more than 200% measured to DIN EN ISO 527-2.

4. The process according to claim 1 wherein the thermoplastic elastomer has a Shore hardness measured to DIN 53505 in the range from A65 to A99.

5. The process according to claim 1 wherein the temperature of the liquid stream in the pelletizing chamber is lowered if the pellets undergo an uncontrolled expansion and do not form an uninterrupted skin, or the temperature of the liquid stream is raised if there is no or insufficient expansion of the pellets.

6. The process according to claim 1 wherein the temperature of the perforated disk is lowered if the pellets undergo an uncontrolled expansion and form an uninterrupted skin, or the temperature of the disk is raised if there is no or insufficient expansion of the pellets.

7. The process according to claim 1 wherein the polymer melt further comprises a nucleating agent.

8. The process according to claim 7 wherein the nucleating agent has a size between 0.01 μm and 100 μm and is selected from talc, calcium fluoride, sodium phenylphosphinate, aluminum oxide, carbon black, graphite, pigments, finely divided polytetrafluoroethylene or a mixture thereof.

9. The process according to claim 1 wherein the blowing agent comprises a co-blowing agent and wherein the co-blowing agent is selected from an alkane, an alcohol, a halogenated hydrocarbon or a mixture thereof.

10. The process according to claim 1 wherein a pressure and a temperature of the pelletizing chamber are chosen such that the bulk density of the expanded pellets is not more than 250 g/l.

11. The process according to claim 1 wherein the temperature of the liquid is between 25° C. and 45° C.

12. The process according to claim 1 wherein the discharged pellets and the liquid stream flow into a dryer, and the pellets are separated from the liquid and collected, and the liquid is filtered and recycled to the pelletizing chamber.

13. The process according to claim 1 wherein the thermoplastic elastomer is a copolyamide, the pressure in the pelletizing chamber is from 5 to 20 bar above ambient pressure, and the blowing agent is present from 1.5 wt % to 2.5 wt %.

14. A process for production of expanded pellets from a thermoplastic elastomer having an elongation at break of more than 200% measured to DIN EN ISO 527-2, and a Shore hardness from A65 to A99 measured to DIN 53505, said process comprising:
(a) pressing a polymer melt comprising the thermoplastic elastomer having an elongation at break of more than 200% measured to DIN EN ISO 527-2 and a blowing agent through a perforated disk controlled to a temperature between 150° C. and 280° C.;
(b) using a cutting device to comminute the polymer melt pressed through the perforated disk into expanded pellets, the expended pellets disposed in a pelletizing chamber;
(c) discharging the pellets from the pelletizing chamber using a liquid stream that traverses the pelletizing chamber, the liquid stream controlled to a temperature between 5° C. and 90° C. and to a pressure of from 0.1 bar to 20 bar above ambient pressure,
wherein the pressure and temperature of the liquid stream, and the temperature of the perforated disk being chosen such that the pellets expand in the pressurized liquid stream to produce expanded pellets having an uninterrupted skin, and the blowing agent comprises $CO_2$ or $N_2$, or a combination of $CO_2$ and $N_2$, and the amount of blowing agent in the polymer melt is in a range from 0.5 to 2.5 wt %.

15. The process according to claim 14 wherein the temperature of the liquid stream in the pelletizing chamber is lowered, or the temperature of the perforated disk is lowered, if the pellets undergo an uncontrolled expansion and do not form an uninterrupted skin.

16. The process according to claim 14 wherein the temperature of the liquid stream is raised temperature, or the temperature of the disk is raised, if there is no or insufficient expansion of the pellets.

* * * * *